(12) United States Patent
Naney et al.

(10) Patent No.: US 12,393,802 B2
(45) Date of Patent: Aug. 19, 2025

(54) IMAGING ENGINES FOR USE WITH INDICIA READERS AND COMPONENTS THEREOF

(71) Applicant: ZEBRA TECHNOLOGIES CORPORATION, Lincolnshire, IL (US)

(72) Inventors: Alexander J. Naney, Kings Park, NY (US); Michael A. Mottola, Sayville, NY (US); Vladimir Gurevich, Great Neck, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/669,402

(22) Filed: May 20, 2024

(65) Prior Publication Data
US 2025/0173531 A1     May 29, 2025

Related U.S. Application Data

(60) Provisional application No. 63/602,626, filed on Nov. 26, 2023.

(51) Int. Cl.
    *G06K 7/10*         (2006.01)

(52) U.S. Cl.
    CPC ..... *G06K 7/10881* (2013.01); *G06K 7/10831* (2013.01); *G06K 2207/1011* (2013.01)

(58) Field of Classification Search
CPC .................. G06K 7/10831; G06K 7/10881
USPC .......................................................... 235/454
See application file for complete search history.

(56) References Cited

U.S. PATENT DOCUMENTS 11,775,783 B1 *   10/2023   Gurevich ........... G06K 7/10732
                                                                             235/462.22

* cited by examiner

*Primary Examiner* — Toan C Ly
(74) *Attorney, Agent, or Firm* — Yuri Astvatsaturov

(57) ABSTRACT

Concepts described in the present disclosure relate to imaging engines used in indicia readers, such as barcode readers. The imaging engine includes a printed circuit board, an imaging sensor, and imaging optics. Also, it includes an aiming assembly with an aiming illumination source and an aiming optics assembly. The assembly has an optic element holder and a first optical lens arrangement, where the optical holder includes at least one feature for active alignment in the XYZ direction. These arrangements produce different aim light patterns when projected on a surface.

14 Claims, 3 Drawing Sheets

IMAGING ENGINES FOR USE WITH INDICIA READERS AND COMPONENTS THEREOF

BACKGROUND

Imaging engines are commonly used by device manufacturers as "drop-in" components for indicia readers of mobile computers, where those drop-in components provide the hardware necessary capturing image data and passing that image data to further to a host. This approach simply the manufacturing of the device as that manufacturer no long needs to be concerned with engineering optical components for image capture. Conversely, imaging engine manufacturers can concentrate their efforts on providing components that can be used across a wide variety of devices. As a result, there is a continued need for improved designs of imaging engines which allow those engines to more easily be implemented across multiple device platforms.

SUMMARY

In an embodiment, the present invention is an imaging engine for use in an indicia reader, comprising: a printed circuit board forming a mounting substrate; an imaging sensor mounted on the printed circuit board and configured to capture image data over a field of view (FOV); imaging optics assembly configured to form the FOV for the imaging sensor; and an aiming assembly having an aiming illumination source, an aiming-assembly chassis, and an aiming optics assembly, the aiming optics assembly having an optic element holder and a first optical lens arrangement positioned within the optic element holder, wherein: the aiming-assembly chassis is at least one of a Zink and a Zink-alloy chassis; the aiming illumination source is coupled to the aiming-assembly chassis such that the aiming-assembly chassis is a heatsink for the aiming illumination source; the optic element holder is a polycarbonate optic element holder; the first optical lens arrangement includes an optical polymer collimator lens; the optic element holder includes at least one active alignment feature for engagement with an active alignment arm or an active alignment apparatus; and the optical element holder is actively aligned relative to the aiming illumination source.

In another embodiment, the present invention is a method of manufacturing an imaging engine for use in an indicia reader, the method comprising: providing a printed circuit board forming a mounting substrate; mounting an imaging sensor on the printed circuit board, the imaging sensor configured to capture image data over a field of view (FOV); assembling an imaging optics assembly to form the FOV for the imaging sensor; providing an aiming assembly having an aiming illumination source, an aiming-assembly chassis, and an aiming optics assembly, the aiming optics assembly having an optic element holder and a first optical lens arrangement positioned within the optic element holder; coupling the aiming illumination source to the aiming-assembly chassis such that the aiming-assembly chassis is a heatsink for the aiming illumination source, the aiming-assembly chassis being at least one of a Zink and a Zink-alloy chassis; and actively aligning the optical element holder relative to the aiming illumination source, wherein the optic element holder is a polycarbonate optic element holder, the first optical lens arrangement includes an optical polymer collimator lens, and the optic element holder includes at least one active alignment feature for engagement with an active alignment arm or an active alignment apparatus.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
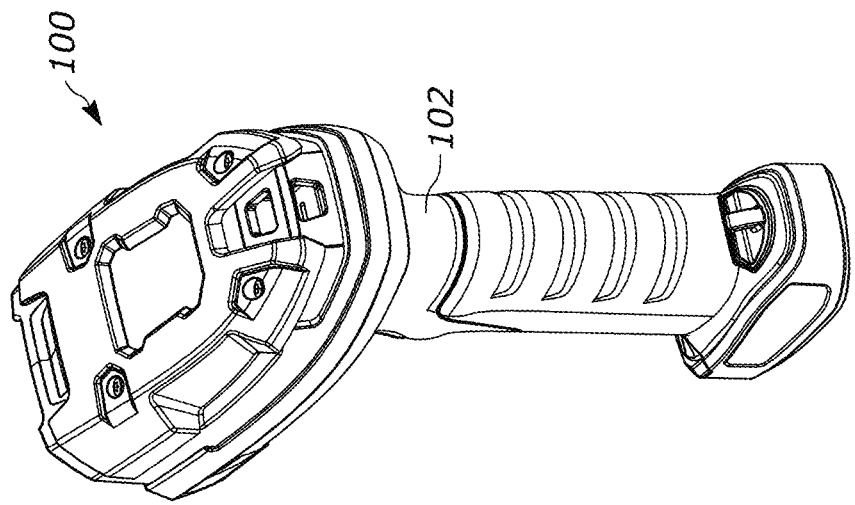
FIG. 1 illustrates a perspective view of an exemplary barcode reader in accordance with the teachings of this disclosure.
Figure 1:
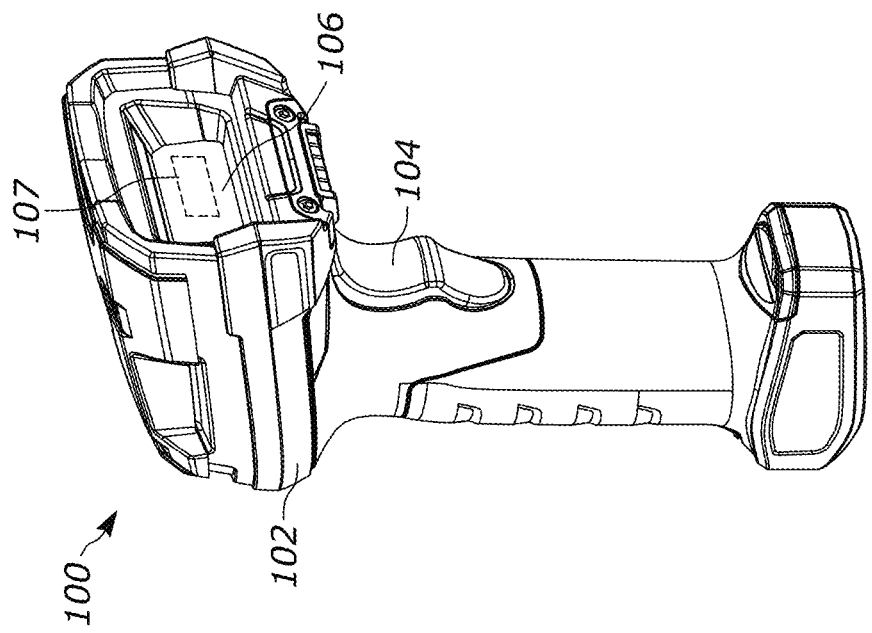

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In barcode scan engines with laser aimer systems, a laser diode is commonly pressed into a Zink chassis for a good heat sinking. To form the aiming pattern, the divergent laser beam is first collimated using a collimator lens which is installed at a precise position relative to the laser source and then passed through a diffractive or refractive optical element which generates the desired pattern. A way to install the collimator lens is to press-fit the lens into the hole in the chassis that provides a good lens centration to the laser housing until a desired distance to the laser sourced is achieved for desired focusing of the laser beam. Alternatively, to minimize size of the scan engines, the collimating lens is installed on the chassis using active XYZ alignment of the lens on the pre-applied adhesive between the lens bottom and the Zink chassis.

To reduce cost of the aiming system, it is possible to make a one-piece molded collimator/pattern generator optical element. However, minimizing molding stresses inside the one-piece lens leads to commonly used optical plastic materials to not adhere well to the Zink chassis. One way to address this issue is to treat the lens with a plasma etching process to modify surface energy of the lens bottom surface for good adhesion to the chassis. However, such approach is expensive and cumbersome, leading to added level of complexity during the manufacturing process. Embodiments disclosed in the present disclosure help address the foregoing issue, but with a more practical approach.

Referring to FIG. 1, shown therein is an example barcode reader 100 having a housing 102 with a cavity for housing internal components, a trigger 104 and a housing window 106. In this example, an example imaging engine 107 is positioned within the cavity of the housing 102 and is configured to capture image data through the housing window 106 and, specifically, to read barcodes (1D and/or 2D) over a working distance range. The imaging engine 107 may be referred to as an imaging engine that includes elements such as, for example, an aiming light assembly, an illumination light assembly, and/or an imaging assembly including optical components and image sensor(s).

The barcode reader 100 can be used in a hands-free mode as a stationary workstation when it is placed on the countertop in a supporting cradle (not shown). The barcode reader 100 can also be used in a handheld mode when it is picked up off the countertop (or any other surface) and held in an operator's hand. In the hands-free mode, products can be slid, swiped past, or presented to the window 106. In the handheld mode, the barcode reader 100 can be aimed at a barcode on a product, and the trigger 104 can be manually depressed to initiate imaging of the barcode. In some implementations, the supporting cradle can be omitted, and the housing 102 can also be in other handheld or non-handheld shapes.

Figure 2:
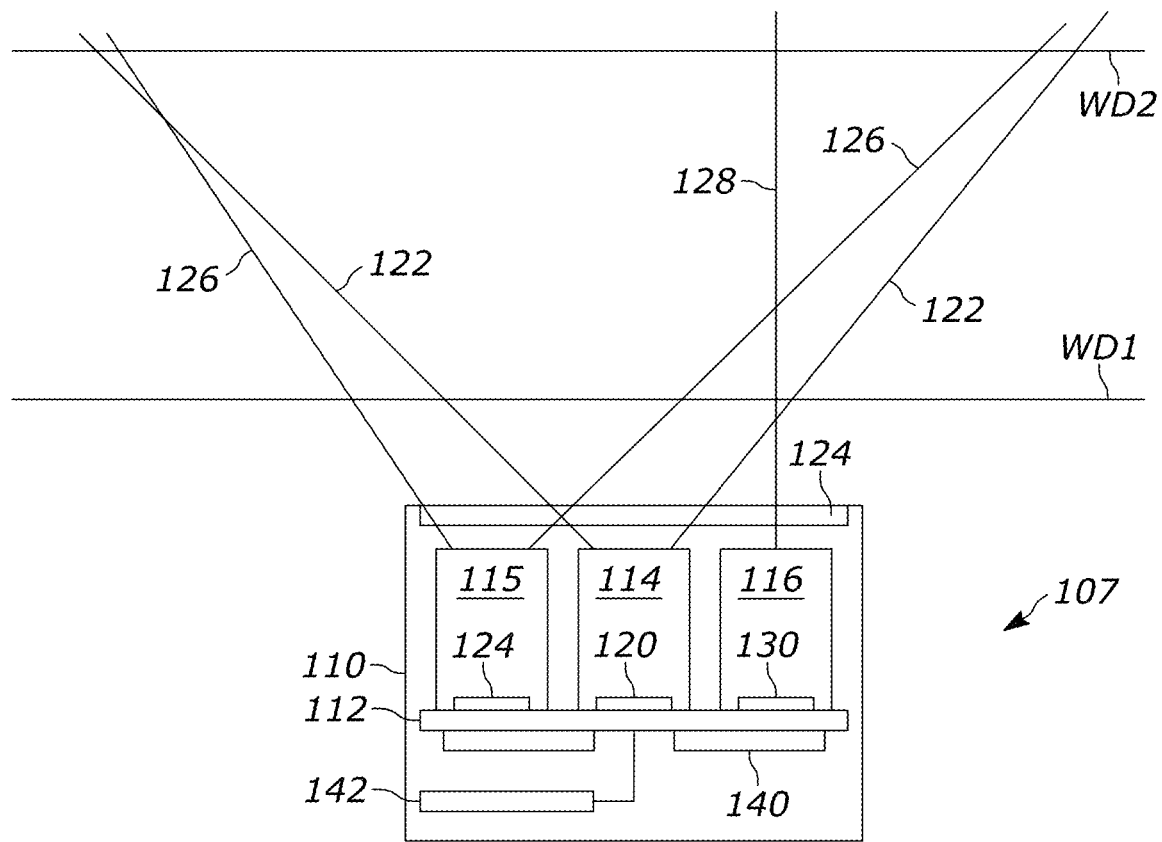
FIG. 2 illustrates a top-down block diagram of an example imaging engine in accordance with various embodiments of the present disclosure.

FIG. 2 illustrates a top-down block diagram of the example imaging engine 107 with its operational components provided in schematic form. The imaging engine 107 includes a housing 110 which supports a printed circuit board (PCB) 112. The PCB 112 functions both as an electrical bus for transmission of electrical signals between various components and as a support structure for mounting those components relative to each other. Mounted on the PCB are an imaging assembly 114, an aiming assembly, 116, and an illumination assembly 118.

The imaging assembly 114 generally comprises an imaging sensor 120 and corresponding imager optics which format the field of view (FOV) 122 over which the imaging sensor 120 collects light for imaging purposes. The imaging sensor 120 can be a solid-state device such as, for example, a CCD or a CMOS imager, having a one-dimensional array of addressable photosensitive elements or pixels arranged in a single row, or a two-dimensional array of addressable photosensitive elements or pixels arranged in mutually orthogonal rows and columns forming a substantially flat surface, and operative for detecting incoming light captured by the optical lens arrangement over the FOV 122 along an imaging axis through the aperture/window 124. Under typical operation, light is scattered and/or reflected from a to-be-read target (e.g. an indicium) over the FOV and the optical lens arrangement focuses the said light onto the array of photosensitive elements to enable an image of a target to be captured as image data and for that image data to be processed accordingly. The optical lens arrangement may include one or more lenses and may be of fixed focus or variable focus kind. The combination of the imaging sensor and the corresponding optics allow the imaging engine 110 to capture images of target between the close-up working distance WD1 and the far-out working distance WD2 where images of those targets could appear with sufficient quality for indicia decoding or other vision analysis purposes.

To help illuminate the targets within the working range defined by the working distance WD1 and WD2, the illumination assembly 118 includes an illumination source 124 along with corresponding illumination optics which help distribute the illumination over a field of illumination 126. In certain embodiments, the field of illumination 126 substantially overlaps with the imaging FOV 122. This allows objects to be effectively illuminated regardless of where they are positioned within the FOV 122. Additionally, the illumination can be provided on a static or a dynamic basis where the intensity of the illumination may be varied based on the distance between the engine 107 and the target that is to-be-imaged. Such approach to illumination can help ensure a consistent level of illumination of a target regardless of whether the object is close or far and avoid over or under saturation. It will be appreciated that the illumination optics may be integrated into the illumination source itself (e.g., an LED with an integrated lens) or they may be separate from the source (e.g., a lens may be positioned on or integrated with the window 124). Additionally, while the illumination assembly is illustrated, it should be appreciated that concepts described in the present disclosure may be practiced without the use or implementation of said assembly.

The imaging engine 107 further includes an aiming assembly 116 that is configured to produce an aiming pattern along the axis 128. In some instances, the aiming pattern can be used to help operators with aiming a device (like the barcode reader 100), it may be used to determine a distance to a target through parallax, and/or identify an indicium to be decoded amongst a plurality of indicia. To provide a relatively definitive aiming marker, the aiming pattern may be any desired pattern like, for example, a dot, crosshairs, a series of dots, a series of dots and lines, a plurality of lines, or any other pattern that is desired. This pattern produced by an aiming illumination source which can be, for example, a laser source or an LED source. Light produced by the aiming illumination source 130 passes through corresponding aiming optics which collimate, diffuse, redirect, or otherwise the direction of light travel to achieve the desired aiming pattern.

It has been recognized that different aiming patterns may desired/required for various use cases where the underlying imaging engine hardware is sufficient to achieve those tasks. To achieve this change, the imaging engine 107 requires a change in its aiming optics. Accordingly, the imaging engine 107 is provided with an aiming assembly 116 that includes an aiming optics assembly with an optic element holder that permits various optical lens arrangements to be interchangeably installed therein, particularly during the manufacture process.

As noted earlier, addressing the need to reduce the imaging engine by providing a one-piece molded collimator/pattern generator lens while still allowing for active alignment results in costly manufacturing approaches. Accordingly, at least some embodiments of the present disclosure provide a solution to this problem by providing splitting the one-piece lens into a polycarbonate lens holder that includes active alignment gripping features for enabling active alignment during manufacturing of the engine and good adhesion to a chassis like a Zink or a Zink-alloy chassis, and a collimator lens made from an optical polymer, like, for example, ZEONEX Cyclo Olefin Polymer (COP), that provides stress-free or low-stress part molding.

Figure 3:
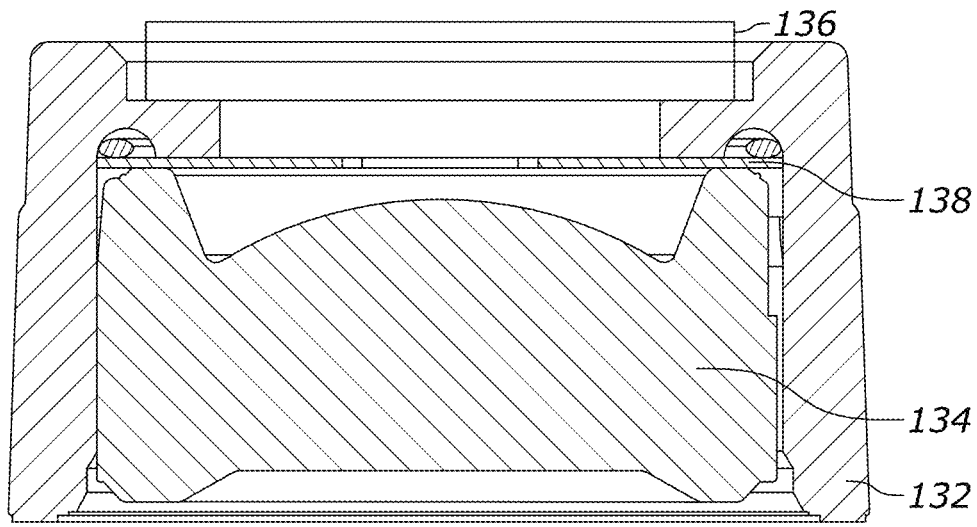
FIG. 3 is a cross-section view of an example optic element holder in accordance with embodiments of the present disclosure.
Figure 4:
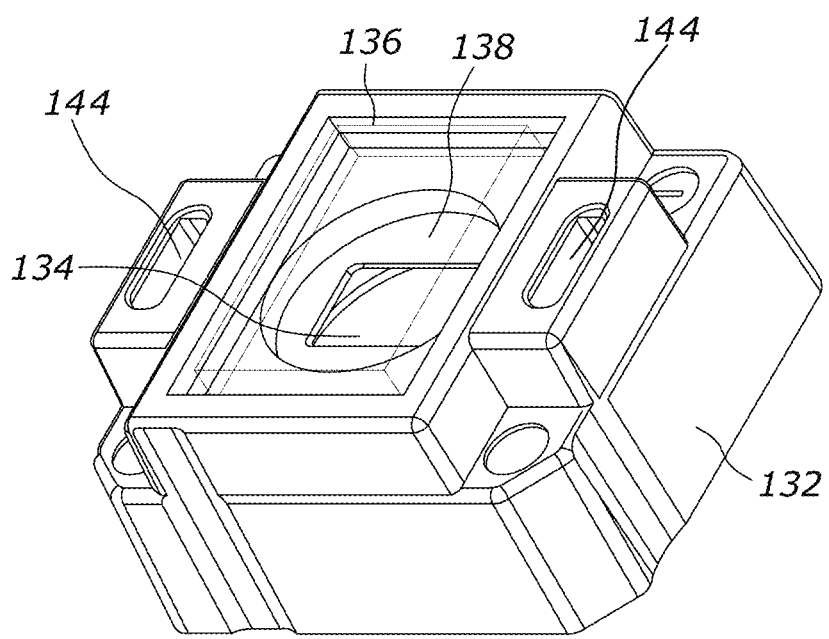
FIG. 4 is a perspective view of an example optic element holder in accordance with embodiments of the present disclosure.

Referring to FIGS. 3 and 4, shown therein is a cross-section and a perspective view of an example optic element holder 132 that is used in conjunction with the aiming assembly 116. Holder 132 is positioned over the aiming illumination source 130 and can be mounted either directly or indirectly to the PCB 112. In a preferred embodiment, the holder 132 is made from a polycarbonate material. In the illustrated embodiment, the optic element holder is configured to hold a lens 134 and a diffractive optical element (DOE) 136 both of which are separated by an aperture 138. Lens 134 may be made from glass, acrylic, or other translucent material that can be used to redirect light in a predetermined way. Once light emitted from the illumination source 130 passes through the lens 134, it is passed through the aperture 138 and subsequently through the DOE 136 which helps form the desired aiming pattern. In various embodiments, the DOE may be replaced with a refractive optical element (ROE) to achieve the desired aiming pattern.

To enable a more efficient manufacturing process, the optic element holder is configured such that it can alternatively receive a first optical element or a second optical element, particularly without substantial or any modifications. This can allow for easier customization/manufacturing of imaging engines having desired aiming patterns being achieved simply by altering the optical elements held by the optic element holder. To that end, the first and second optical elements may be any one or more optical elements positioned within the element holder. For example, referring to element holder 132 of FIGS. 3 and 4, the holder may be configured to alternatively receive a first lens 134 having a first set of light propagating properties and a second lens 134 having a second (different from first) set of light propagating properties. In another example, the holder 132 may be configured to alternatively receive a first aperture 138 having a first set of light limiting properties and a second aperture 138 having a second (different from first) set of light limiting properties. In still another example, the holder 132 may be configured to alternatively receive a first DOE 136 having a first set of light propagating properties and a second DOE 136 having a second (different from first) set of light propagating properties. Additionally, the holder may be configured to accept alternate configurations of multiple optical elements. For example, it may be configured to alternatively receive a first lens 134 and first DOE 136 both of which combine to produce a first aiming pattern, and a second lens 134 and second DOE 136 both of which combine to produce a second aiming pattern.

Additionally, the holder 132 is configured to provide active alignment gripping features operable to be gripped by an arm of an active alignment apparatus. In the present example, the gripping features are provided as apertures 144 which can be engaged by an arm of an active alignment apparatus. When secured by the arm, the holder, together with the optical elements secured thereby can be aligned in the XZY direction and fixedly secured by way of an adhesive in a desired position relative to the laser source.

While the above concepts have been described with respect to the holder of the optical elements associated with the aiming assembly, it should be appreciated that in various embodiments the same interchangeable nature of the holder can also be implemented on either the imaging assembly and/or the illumination assembly. In other words, taking the imaging assembly as an example, said assembly may include a holder configured to alternatively receive a first or a second optical lens where the first and the second optical lens has different optical characteristics.

Additionally, the particular design of the optic element holder, as describe herein, is particularly useful in implementing active alignment of the optical elements relative to the aiming illumination source without the need to a Zink chassis.

Referring back to FIG. 2, in addition to the elements described above the imaging engine 107 further incudes a memory 140 and a controller 142. Both of these components may be conventional components where the memory is used to store computer-readable instructions which, when executed, cause the engine 107 to perform carious tasks, and where the controller is operable to execute the instructions stored in the memory and provide necessary control signals to the various electronic components. Additionally, the controller may include a deciding module (or such decoding module may be implemented separately) where it is configured to analyze the image data and decode at least one indicium present in the image data. If an indicium is found and decoded, the payload of that indicium can be transmitted to a host for further processing.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. An imaging engine for use in an indicia reader, comprising:
   a printed circuit board forming a mounting substrate;
   an imaging sensor mounted on the printed circuit board and configured to capture image data over a field of view (FOV);
   imaging optics assembly configured to form the FOV for the imaging sensor; and
   an aiming assembly having an aiming illumination source, an aiming-assembly chassis, and an aiming optics assembly, the aiming optics assembly having an optic element holder and a first optical lens arrangement positioned within the optic element holder,
   wherein:
   the aiming-assembly chassis is at least one of a Zink and a Zink-alloy chassis;
   the aiming illumination source is coupled to the aiming-assembly chassis such that the aiming-assembly chassis is a heatsink for the aiming illumination source;
   the optic element holder is a polycarbonate optic element holder;
   the first optical lens arrangement includes an optical polymer collimator lens;
   the optic element holder includes at least one active alignment feature for engagement with an active alignment arm or an active alignment apparatus; and
   the optical element holder is actively aligned relative to the aiming illumination source.

2. The imaging engine of claim 1, wherein the first optical lens arrangement is configured to receive light from the aiming illumination source and to produce a first aim light pattern when projected on a surface, and wherein the optic element holder is configured to have alternatively positioned therein a second optical lens arrangement that is configured to receive the light from the aiming illumination source and to produce a second aim light pattern when projected on the surface, the second aim light pattern being different from the first aim light pattern; and
   a controller operatively coupled to and configured to control operation of each of the imaging sensor.

3. The imaging engine of claim 1, wherein the first optical lens arrangement includes a first lens and a first diffractive optical element, and
   wherein the second optical lens arrangement includes a second lens and the first diffractive optical element.

4. The imaging engine of claim 1, wherein the first optical lens arrangement includes a first lens and a first diffractive optical element, and
   wherein the second optical lens arrangement includes the first lens and a second diffractive optical element.

5. The imaging engine of claim 1, wherein the optic element holder includes an aperture positioned between optical elements of the first optical lens arrangement.

6. The imaging engine of claim 1, wherein the optic element holder includes a support structure for respectively supporting optical elements of each of the first optical lens arrangement and the second optical lens arrangement, and
   wherein therein the optic element holder is configured to have alternatively positioned therein the second optical lens arrangement without modification of the support structure.

7. The imaging engine of claim 1, further comprising a decoding module configured to analyze the image data and decode at least one indicium present in the image data.

8. The imaging engine of claim 7, wherein the controller if further operatively coupled to the decoding module, and
   wherein, responsive to the decoding module decoding the at least one indicium, a controller is configured to cause the imaging engine to transmit a payload of the at least one indicium to a host.

9. The imaging engine of claim 1, further comprising an illumination assembly configuration to provide illumination light over the FOV, the illumination light being provided during at least some portion of a time when the image data is captured.

10. A method of manufacturing an imaging engine for use in an indicia reader, the method comprising:
    providing a printed circuit board forming a mounting substrate;
    mounting an imaging sensor on the printed circuit board, the imaging sensor configured to capture image data over a field of view (FOV);

assembling an imaging optics assembly to form the FOV for the imaging sensor;

providing an aiming assembly having an aiming illumination source, an aiming-assembly chassis, and an aiming optics assembly, the aiming optics assembly having an optic element holder and a first optical lens arrangement positioned within the optic element holder;

coupling the aiming illumination source to the aiming-assembly chassis such that the aiming-assembly chassis is a heatsink for the aiming illumination source, the aiming-assembly chassis being at least one of a Zink and a Zink-alloy chassis; and actively aligning the optical element holder relative to the aiming illumination source, wherein the optic element holder is a polycarbonate optic element holder, the first optical lens arrangement includes an optical polymer collimator lens, and the optic element holder includes at least one active alignment feature for engagement with an active alignment arm or an active alignment apparatus.

11. The method of claim 10, further comprising:
operatively coupling a controller to each of the imaging sensor and the illumination source, and configuring the controller to control operation of each of the imaging sensor and the illumination source.

12. The method of claim 10, wherein positioning the first optical lens arrangement includes positioning a first lens and a first diffractive optical element within the optic element holder.

13. The method of claim 10, wherein configuring the optic element holder includes configuring the holder to alternatively position therein a second optical lens arrangement without modification of a support structure of the optic element holder.

14. The method of claim 10, further comprising configuring an illumination assembly to provide illumination light over the FOV, the illumination light being provided during at least some portion of a time when the image data is captured.

* * * * *